US010791251B2

(12) United States Patent
Ito et al.

(10) Patent No.: US 10,791,251 B2
(45) Date of Patent: Sep. 29, 2020

(54) IMAGING DEVICE AND IMAGING SYSTEM

(71) Applicant: CANON KABUSHIKI KAISHA, Tokyo (JP)

(72) Inventors: Maasa Ito, Tokyo (JP); Tomoya Onishi, Ayase (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/425,128

(22) Filed: May 29, 2019

(65) Prior Publication Data
US 2019/0281192 A1 Sep. 12, 2019

Related U.S. Application Data

(63) Continuation of application No. 15/709,816, filed on Sep. 20, 2017, now Pat. No. 10,356,286.

(30) Foreign Application Priority Data

Oct. 7, 2016 (JP) .................. 2016-198662

(51) Int. Cl.
| H04N 5/374 | (2011.01) |
| H04N 3/14 | (2006.01) |
| H04N 5/345 | (2011.01) |
| H04N 5/3745 | (2011.01) |
| H04N 5/341 | (2011.01) |
| H04N 5/376 | (2011.01) |
| H04N 5/77 | (2006.01) |

(52) U.S. Cl.
CPC ............ *H04N 3/155* (2013.01); *H04N 5/341* (2013.01); *H04N 5/345* (2013.01); *H04N 5/376* (2013.01); *H04N 5/37457* (2013.01); *H04N 5/772* (2013.01)

(58) Field of Classification Search
CPC ..................................... H04N 3/155
USPC ....................................... 348/297
See application file for complete search history.

(56) References Cited

U.S. PATENT DOCUMENTS

| 7,773,126 B1 | 8/2010 | Lee |
| 9,142,575 B2 | 9/2015 | Kobayashi |
| 2005/0046715 A1 | 3/2005 | Lim |
| 2009/0129704 A1* | 5/2009 | Toda .................. G06T 3/4053 382/299 |
| 2015/0319384 A1 | 11/2015 | Onishi |
| 2016/0050381 A1 | 2/2016 | Onishi |
| 2016/0330414 A1 | 11/2016 | Takado |
| 2016/0344956 A1 | 11/2016 | Takado |

FOREIGN PATENT DOCUMENTS

JP 2009-225229 10/2009

* cited by examiner

*Primary Examiner* — Joel W Fosselman
(74) *Attorney, Agent, or Firm* — Venable LLP

(57) ABSTRACT

An imaging device includes a plurality of pixels arranged in a plurality of rows, in which each of the plurality of pixels outputs a pixel signal; a row scanning unit that scans the plurality of pixels on a row basis; and an output unit that outputs first time information corresponding to a processing timing of the pixel signal on one of the plurality of rows and second time information corresponding to the pixel signal on another of the plurality of rows and having a different value from the first time information.

41 Claims, 13 Drawing Sheets

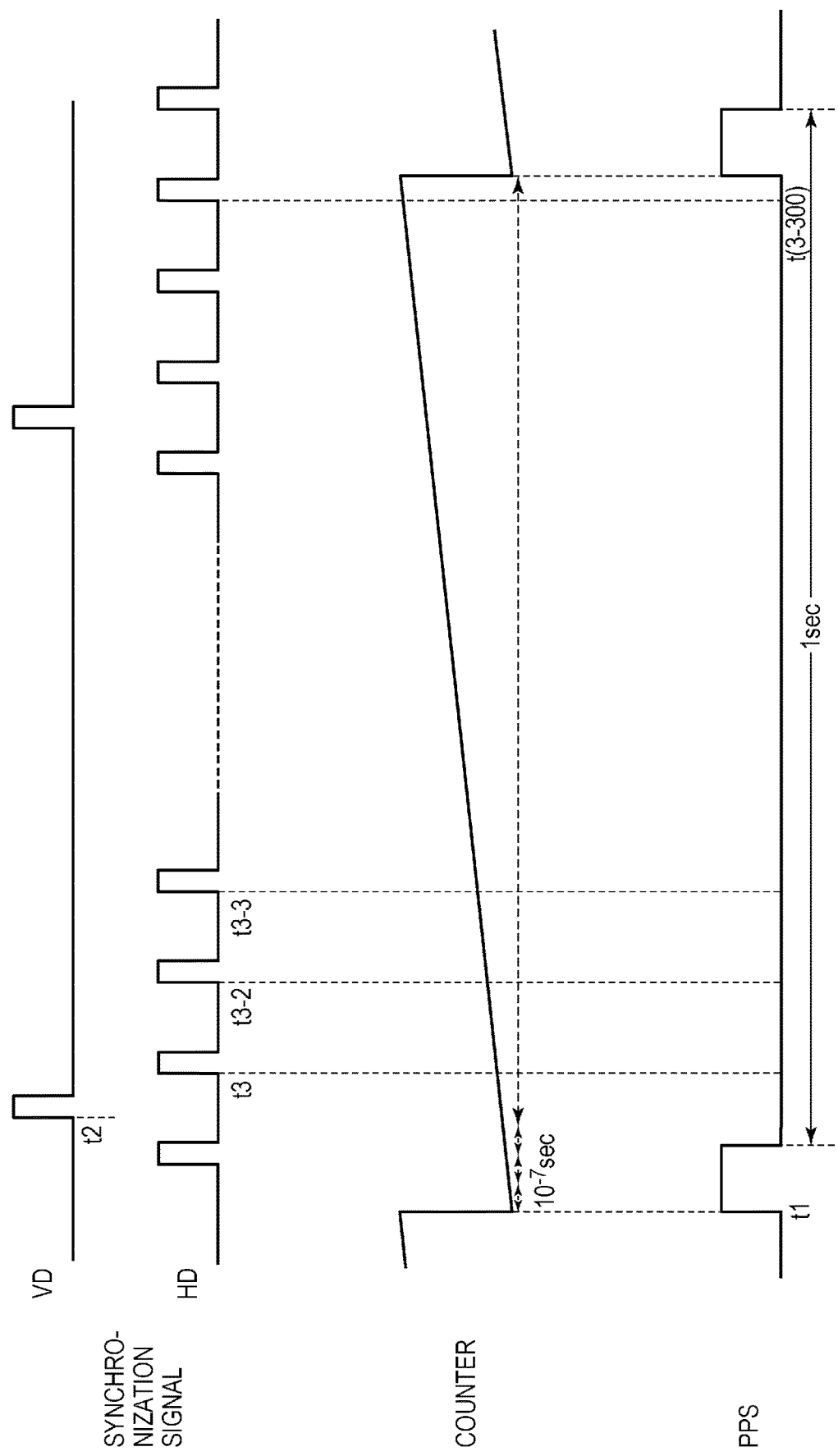

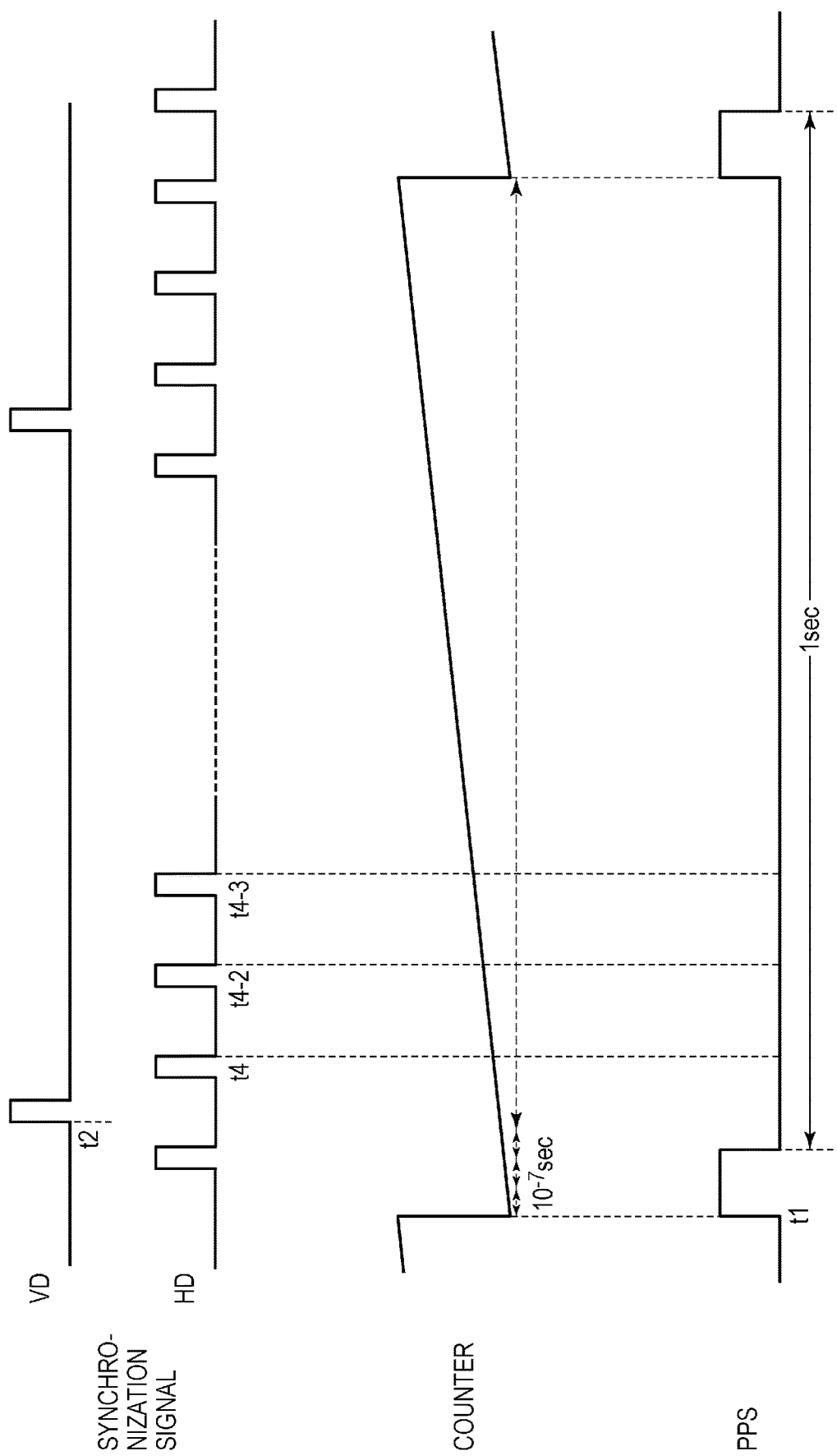

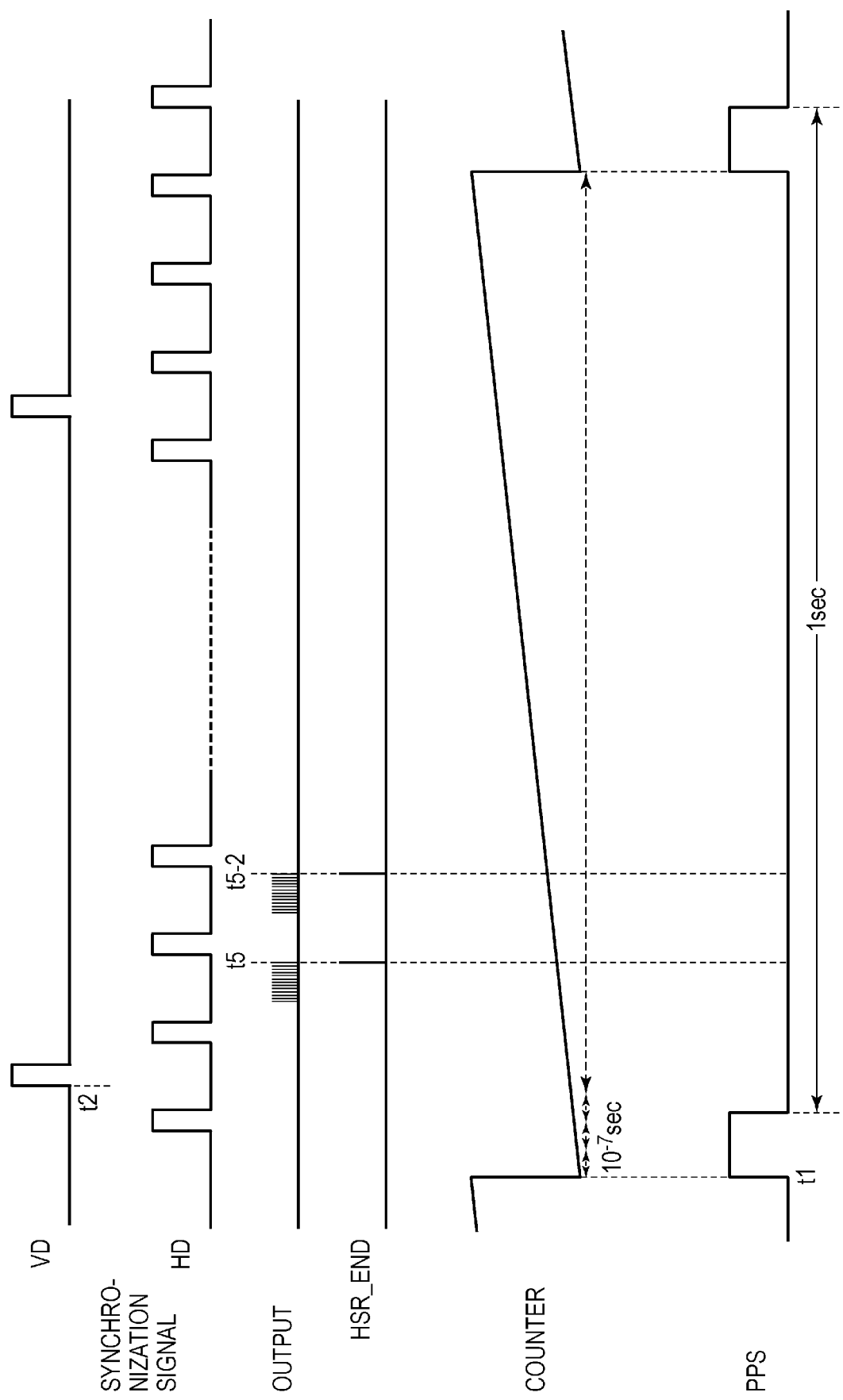

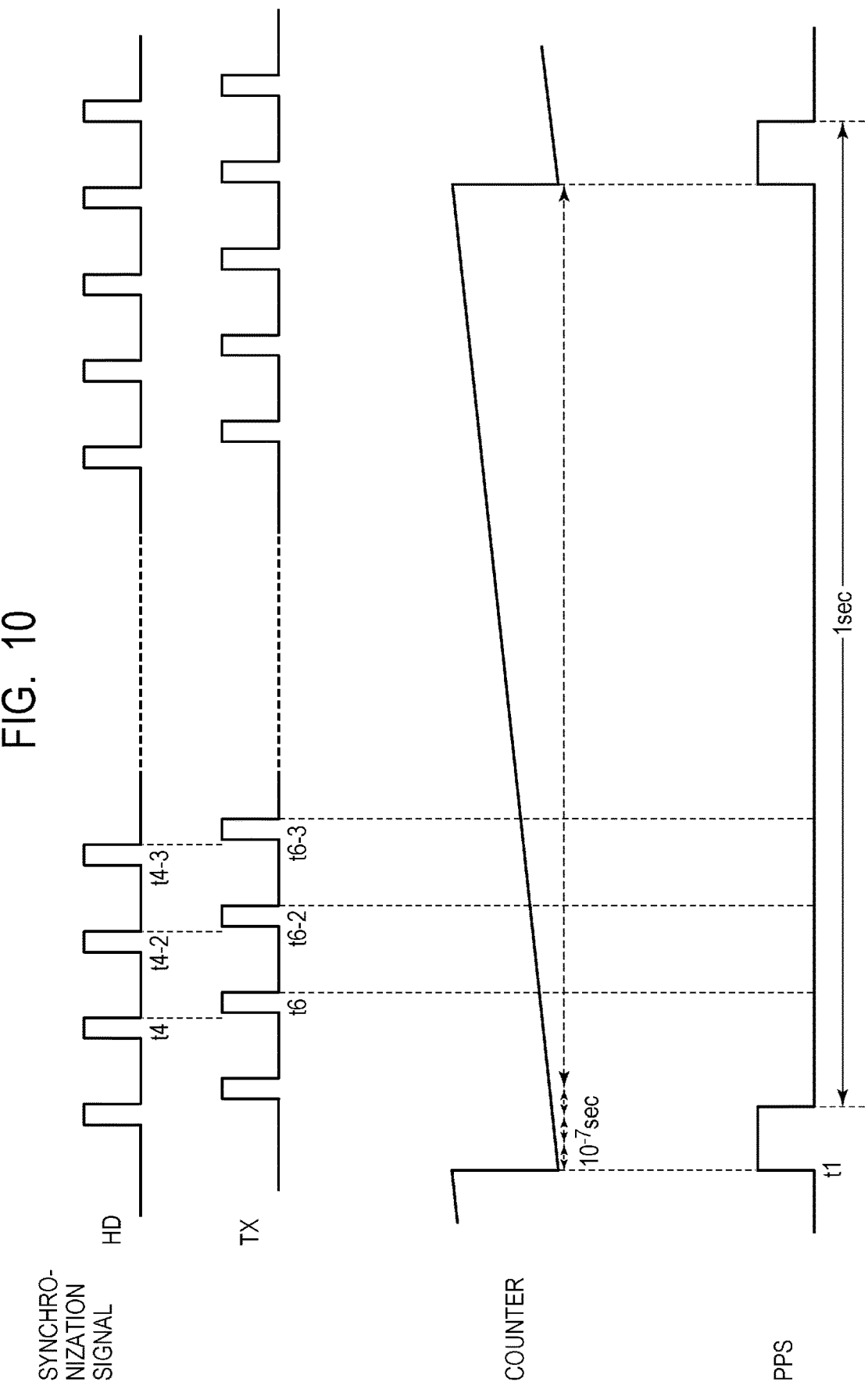

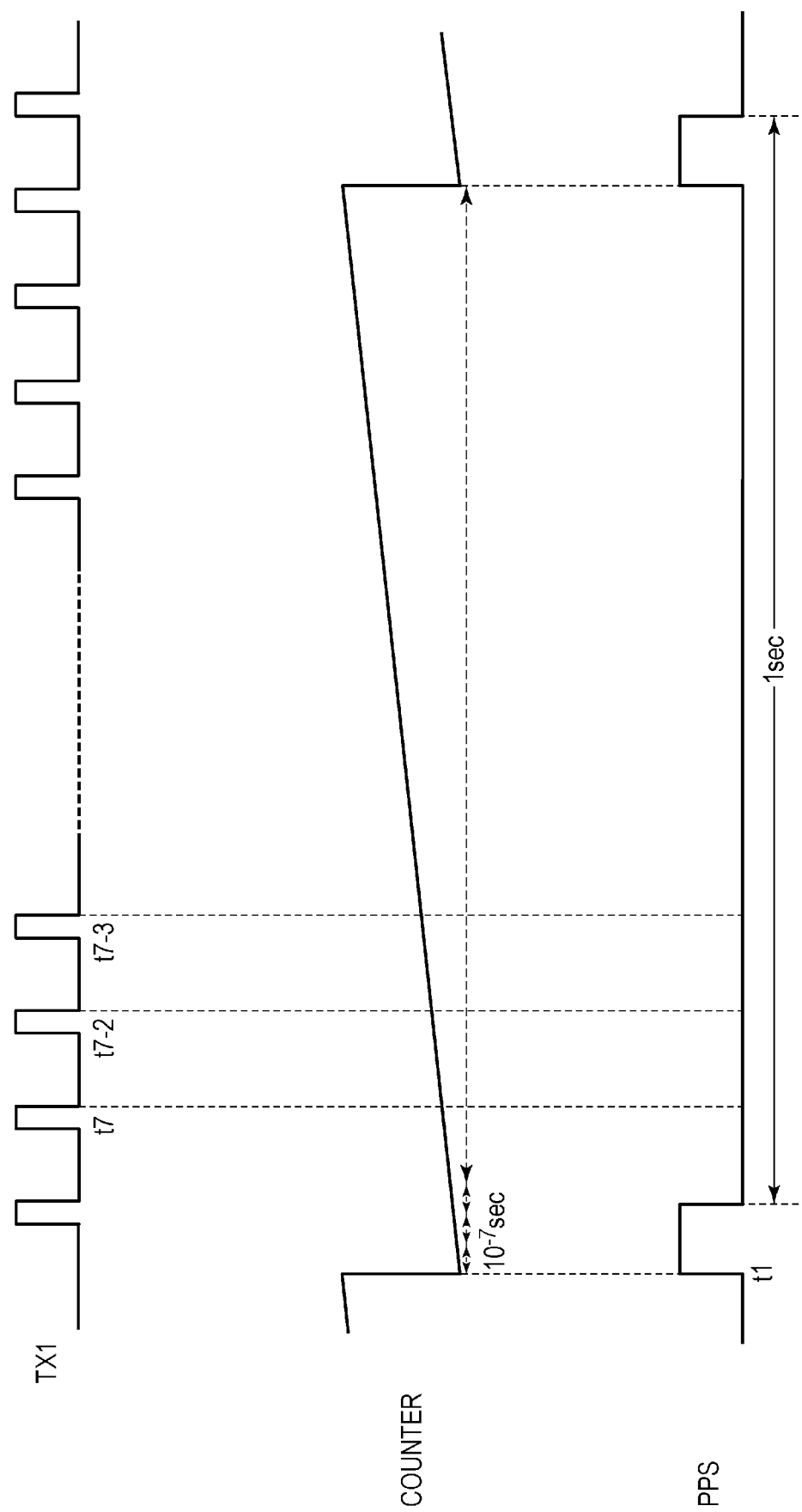

IMAGING DEVICE AND IMAGING SYSTEM

This application is a continuation of U.S. application Ser. No. 15/709,816, filed Sep. 20, 2017, which claims priority to Japan 2016-198662, filed on Oct. 7, 2016, the contents of each of which is hereby incorporated by reference.

BACKGROUND OF THE INVENTION

Field of the Invention

The present invention relates to an imaging device and an imaging system.

Description of the Related Art

In the field of electronic cameras, there is a technology of adding capturing information such as the date of capturing, the location of capturing, or the like to image data (Japanese Patent Application Laid-Open No. 2009-225229). In the art of Japanese Patent Application Laid-Open No. 2009-225229, capturing information is added to image data based on the Exchangeable Image File (Exif) format in the Design rule of Camera File System (DCF) specification.

The prior art merely adds one piece of time information to one frame of a motion image. Therefore, in the prior art, time information corresponding to a processing timing of a pixel signal on one row of a plurality of rows and time information corresponding to a processing timing of a pixel signal on another row of the plurality of rows cannot be obtained.

SUMMARY OF THE INVENTION

An imaging device according to one aspect of the present invention includes: a plurality of pixels arranged in a plurality of rows, in which each of the plurality of pixels outputs a pixel signal; a row scanning unit that scans the plurality of pixels on a row basis; and an output unit that outputs first time information corresponding to a processing timing of the pixel signal on one of the plurality of rows and second time information corresponding to the pixel signal on another of the plurality of rows and having a different value from the first time information.

An imaging system according to another aspect of the present invention includes an imaging device and an information generation unit that generates time information. The imaging device includes a plurality of pixels arranged in a plurality of rows, a row scanning unit that scans the plurality of pixels on a row basis, a readout unit that reads out pixel signals respectively from the plurality of pixels on a selected row, and an output unit that outputs a plurality of the pixel signals from the readout unit as image data on a frame basis. The information generation unit generates, as the time information, first time information corresponding to a processing timing of the pixel signal on one of the plurality of rows and second time information corresponding to the pixel signal on another of the plurality of rows and having a different value from the first time information.

Further features of the present invention will become apparent from the following description of exemplary embodiments with reference to the attached drawings.

BRIEF DESCRIPTION OF THE DRAWINGS

FIG. 5 is a timing chart of the imaging system of the first embodiment.

FIG. 8 is a timing chart of an imaging system of a second embodiment.

FIG. 9 is a timing chart of an imaging system of a third embodiment.

FIG. 10 is a timing chart of an imaging system of a fourth embodiment.

FIG. 12 is a timing chart of an imaging system of the fifth embodiment.

DESCRIPTION OF THE EMBODIMENTS

Preferred embodiments of the present invention will now be described in detail in accordance with the accompanying drawings.

First Embodiment

Figure 1:
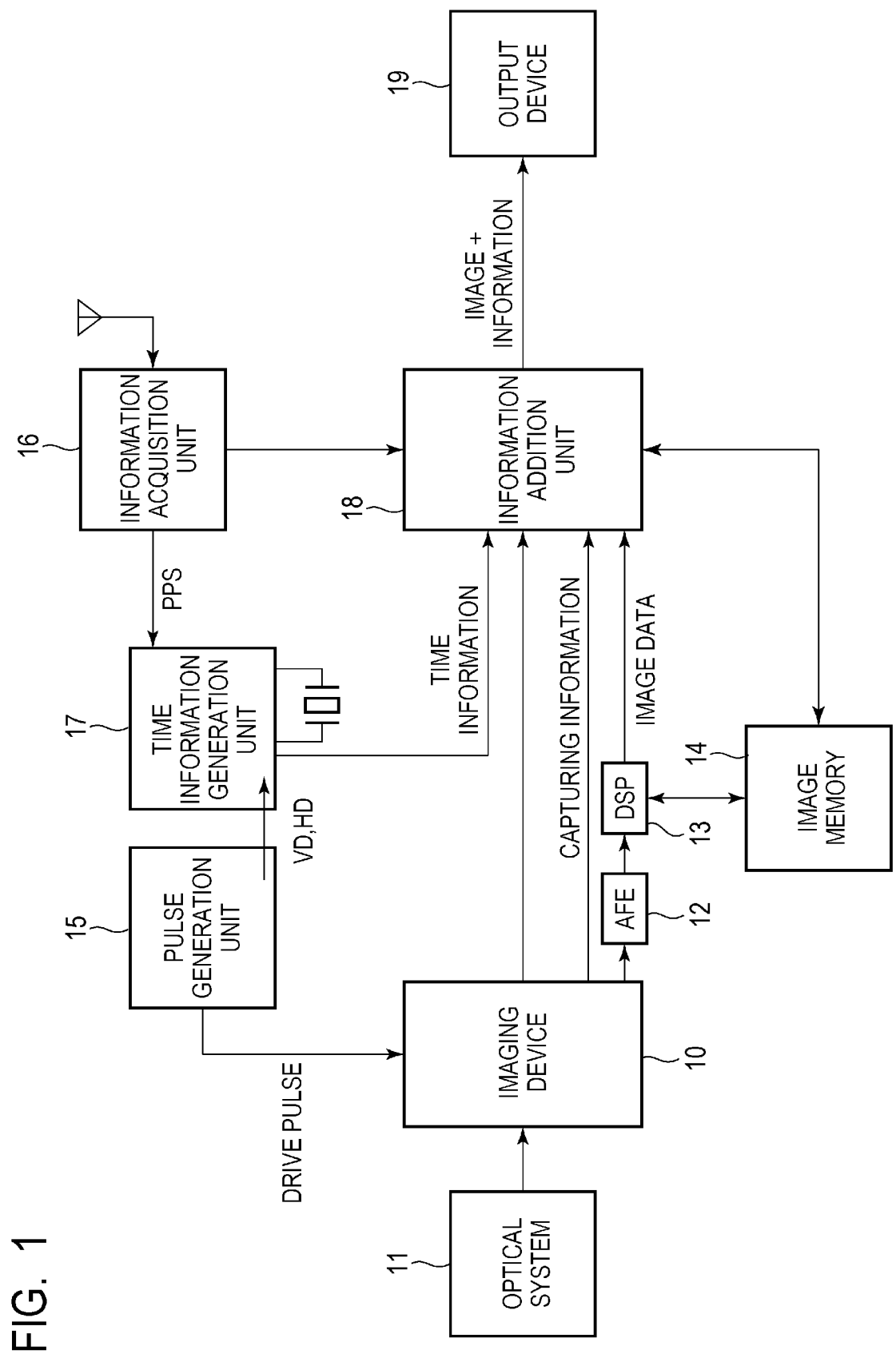
FIG. 1 is a block diagram of an imaging system of a first embodiment.

FIG. 1 is a block diagram of an imaging system of the first embodiment of the present invention. As illustrated in FIG. 1, the imaging system includes an imaging device 10, an optical system 11, an Analog Front End (AFE) 12, a Digital Signal Processor (DSP) 13, an image memory 14, a pulse generation unit 15, a time acquisition unit 16, a time information generation unit 17, and an information addition unit 18.

The imaging device 10 is a CMOS area sensor in the present embodiment, which has a plurality of pixels two-dimensionally aligned and converts an optical signal that has entered via the optical system 11 such as a lens into a pixel signal that is an electrical signal. The AFE 12 includes a differential amplifier, a clamping circuit, and an analog-to-digital conversion circuit to output digital pixel data. The DSP 13 is a circuit that processes pixel data and performs gradation correction such as a gamma process, white balance correction, digital signal processing such as de-pixelization, noise reduction, or the like. The image memory 14 is a frame memory that temporarily holds image data resulted from digital signal processing. The pulse generation unit 15 generates a vertical synchronization signal VD and a horizontal synchronization signal HD of the imaging device 10 and a control signal of the imaging device 10.

The time acquisition unit 16 has an antenna that receives radio waves from a plurality of Global Positioning System (GPS) satellites, a receiving circuit that processes a baseband signal, and a demodulation circuit that demodulates information contained in the received signal. Accurate information of the longitude, latitude, and altitude of the imaging system can be acquired based on time differences among received radio waves from the plurality of GPS satellites. Further, a received radio wave from the GPS satellite includes GPS time information (GPS week information, GPS second information) as the reference time and leap-second information. The GPS week information is information circulating from 0 to 1023 started from Jan. 6, 1980. The GPS second information is elapsed second information within the GPS week and can take a value within 604800 seconds=7 days×24 hours×60 minutes×60 seconds. The leap-second information represents a difference between the GPS time and the Universal Time Coordinated (UTC) and is used in converting the GPS time into the UTC. Further, in demodulating the received radio wave, the time acquisition unit 16 outputs an accurate signal of one pulse per second called a Pulse Per Second (PPS) signal.

The time information generation unit 17 includes a clock circuit and uses the PPS signal and the horizontal synchronization signal HD to generate time information having a higher time-resolution than the GPS time information. The time information generation unit 17 counts a counter that is counted up at 10 MHz, that is, by $10^{-7}$ seconds, for example, and resets the counter at a rising edge of the PPS signal. The use of the PPS signal for resetting a counter allows for generating accurate time information in which errors are not accumulated.

The information addition unit 18 adds, to image data, time information generated by the time information generation unit 17. Furthermore, the information addition unit 18 can add, to image data, location information or capturing information in addition to the time information. An output device (an output unit) 19 can output image data on a frame basis and may include a digital interface, an interface for a storage medium such as a memory card, a display circuit for a display device such as a display, or the like.

Figure 2:
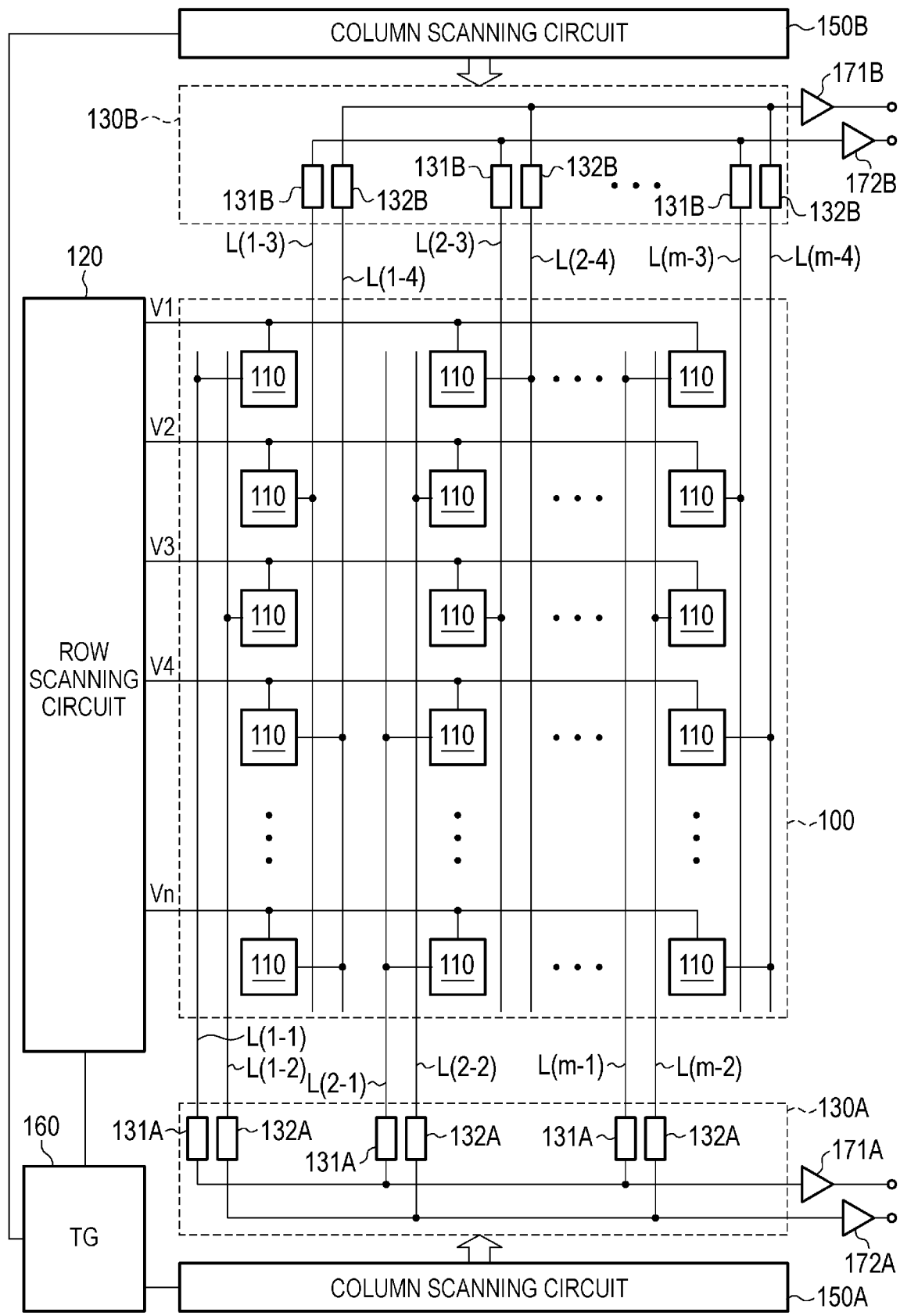
FIG. 2 is a block diagram of an imaging device of the first embodiment.

FIG. 2 is a block diagram of the imaging device 10. The imaging device 10 includes a pixel unit 100, a row scanning circuit (a row scanning unit) 120, column readout circuits (readout units) 130A and 130B, column scanning circuits 150A and 150B, a timing generator 160, and output circuits 171A, 172A, 171B, and 172B. In the pixel unit 100, a plurality of pixels 110 are arranged in a two-dimensional matrix in the row direction and the column direction. While the pixel unit 100 of FIG. 2 includes the pixels 110 of n rows by m columns, the limited number of pixels 110 are depicted for simplified illustration. Note that, in the present specification, the row direction corresponds to the horizontal direction in the drawings, and the column direction corresponds to the vertical direction in the drawings. In the pixel unit 100, ranging rows in which focus detection pixels that output signals used for focus detection are arranged and a plurality of capturing rows in which capturing pixels that output signals used for generating an image are arranged are provided. Further, some of the pixels 110 of the pixel unit 100 are light-shielded as an optical black (OB) pixels.

Each of the pixels 110 includes a color filter, a micro lens, a photoelectric conversion unit, a floating diffusion part, a reset transistor, a transfer transistor, an amplification transistor, a selection transistor, and the like. The color filter is primary colors of red, blue, and green, for example, and is provided in each pixel 110 according to the Bayer arrangement.

In response to receiving control signals from the timing generator 160, the row scanning circuit 120 performs readout scan on the pixel unit 100 on a row basis. That is, control signals V1 to Vn are provided from the row scanning circuit 120 to pixel rows on which a plurality of pixels 110 are arranged, and photoelectrically converted signals are read out from the pixels 110. Each of the control signals V1 to Vn includes control signals that turns on or off the reset transistor, the transfer transistor, and the selection transistor included in the pixel 110. The plurality of pixels 110 in the column direction are connected to 4×m column signal lines L(1-1) to L(1-4), . . . , L(m-1) to L(m-4), respectively. For example, a plurality of pixels 110 on the first column are connected to the column signal lines L(1-1), L(1-2), L(1-3), and L(1-4), and a plurality of pixels 110 on the second column are connected to the column signal lines L(2-1), L(2-2), L(2-3), and L(2-4). The column signal lines L(1-1), L(1-2), . . . , L(m-1), and L(m-2) are connected to the column circuits 131A and 132A of the column readout circuit 130A, respectively.

The column circuits 131A and the column circuits 132A are scanned by the column scanning circuit 150A to sequentially output pixel signals to the output circuits 171A and 172A. Similarly, the column signal lines L(1-3), L(1-4), . . . , L(m-3), and L(m-4) are connected to the column circuits 131B and 132B of the column readout circuit 130B, respectively. The column circuits 131B and the column circuits 132B are scanned by the column scanning circuit 150B to sequentially output pixel signals to the output circuits 171B and 172B. The pixel signals from the output circuits 171A, 172A, 171B, and 172B are output to the AFE 12 of FIG. 1.

In the present embodiment, since four column circuits 131A, 132A, 131B, and 132B are provided to the pixels 110 on each column, pixel signals from the pixels 110 on four rows at most can be simultaneously read out. Note that the number of pixel rows on which simultaneous readout is possible is not limited to four and may be one, two, or more than four. Furthermore, pixel signals on a plurality of rows may be added and read out.

Each of the column circuits 131A, 132A, 131B, and 132B includes a constant current source that is a load of an amplification transistor, a differential amplification circuit that amplifies a pixel signal, a holding circuit that temporarily holds a pixel signal, and the like. The timing generator 160 functions as a control unit and outputs the vertical synchronization signal VD, the horizontal synchronization signal HD, and a control signal based on a reference clock (not illustrated) to the row scanning circuit 120 and the column scanning circuits 150A and 150B.

Figure 3:
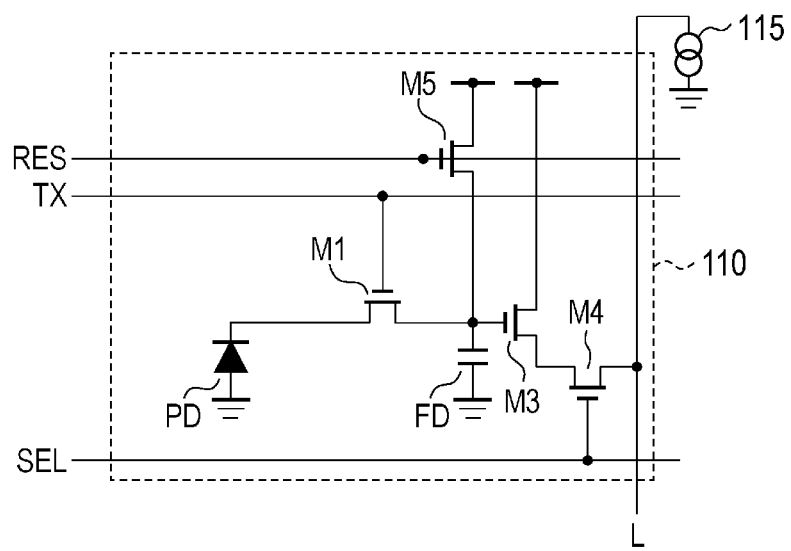
FIG. 3 is an equivalent circuit diagram of a pixel of the first embodiment.

FIG. 3 illustrates an equivalent circuit of the pixel 110 of the imaging device 10 according to the present embodiment. The pixel 110 includes a photoelectric conversion unit PD, a floating diffusion part FD, a transfer transistor M1, an amplification transistor M3, a selection transistor M4, and a reset transistor M5.

The photoelectric conversion unit PD photoelectrically converts an incident light that has passed through a color filter and a micro lens and accumulates charges generated by the photoelectric conversion. When turned on, the transfer transistor M1 transfers charges of the photoelectric conversion unit PD to the floating diffusion part FD of the amplification transistor M3. The drain of the amplification transistor M3 is connected to the power source voltage line, and the source thereof outputs a signal based on the voltage of the floating diffusion part FD to a column signal line L via the selection transistor M4. A constant current source 115 is connected to the column signal line L. When turned on, the reset transistor M5 resets the voltage of the floating diffusion part FD.

A common control signal is supplied to the pixels 110 on the same row from the row scanning circuit 120. That is, the control signals TX, SEL, and RES are supplied to the transfer transistor M1, the selection transistor M4, and the reset transistor M5, respectively, on the same row. Each of these transistors is turned on when the corresponding control signal is a high level, and turned off when the corresponding control signal is a low level. Note that a plurality of pixels 110 may share a single amplification transistor M3.

Figure 4:
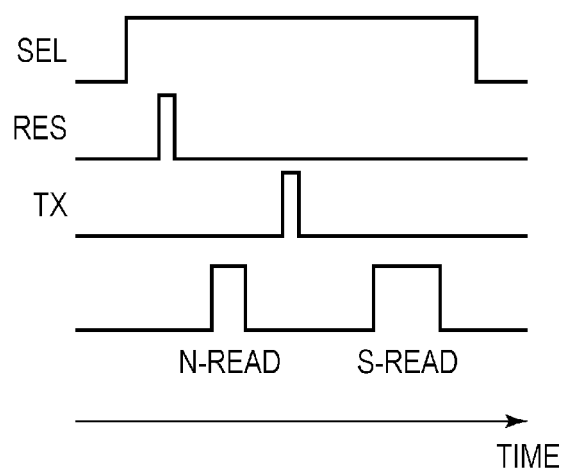
FIG. 4 is a timing chart of control signals of the first embodiment.

FIG. 4 is a timing chart of control signals according to the present embodiment and represents the operation of readout of a pixel signal. FIG. 4 illustrates the control signal SEL supplied to the selection transistor M4, the control signal RES supplied to the reset transistor M5, and the control signal TX supplied to the transfer transistor M1. Each of the transistors M1, M4, and M5 is turned on when the corresponding control signal is a high level, and turned off when the corresponding control signal is a low level.

The operation of readout of a pixel signal will be described below with reference to FIG. 2 and FIG. 3. First, the row scanning circuit 120 sets the control signal SEL to a high level to turn on the selection transistor M4 and selects the pixel 110 from which a signal is read out. Next, the row scanning circuit 120 sets the control signal RES to a high level to turn on the reset transistor M5. Once the reset transistor M5 is turned on, the voltage of the floating diffusion part FD is reset to the power source voltage. After the reset transistor M5 is turned off, the column readout circuits 130A and 130B perform readout of pixel signals at the time of reset from the column signal line L (N-read). The row scanning circuit 120 sets the control signal TX to a high level to turn on the transfer transistor M1 and transfers charges of the photoelectric conversion unit PD to the floating diffusion part FD. The column readout circuits 130A and 130B perform readout of pixel signals at the time of photoelectric conversion from the column signal line L (S-read). The pixel signals read out in such a way are subjected to a correlated double sampling process in the column readout circuits 130A and 130B and are output from the output circuits 171A, 172A, 171B, and 172B. Note that the correlated double sampling process may be performed after analog-to-digital (AD) conversion of pixel signals.

FIG. 5 is a timing chart of an imaging system of the present embodiment and illustrates the vertical synchronization signal VD, the horizontal synchronization signal HD, a counter, and the PPS signal. The counter is a digital value that is counted up every $10^{-7}$ seconds in the time information generation unit 17 and reset at a rising edge of the PPS signal of the GPS.

Once the imaging system is powered on, the pulse generation unit 15 outputs the vertical synchronization signal VD, the horizontal synchronization signal HD, and the control signal, and the imaging device 10 starts a capturing operation. The time acquisition unit 16 receives radio waves from the GPS satellites and starts acquiring GPS location information and GPS time information.

At the time t1, in response to acquiring the PPS signal from the received radio wave, the time acquisition unit 16 outputs the PPS signal to the time information generation unit 17. In response to detecting a rising edge of the PPS signal, the time information generation unit 17 resets the counter. The use of the counter that is reset synchronized with the PPS signal allows for generating time information having a time resolution of a unit of µ second that is higher than the time resolution of one second, which is the update period of the GPS time information. At the same time as the time t1, the time acquisition unit 16 acquires GPS time information including GPS week information and GPS second information from the received radio wave and converts the GPS time information into time information in a form of year/month/date/hour/minute/second. The GPS time information is acquired every one second of the PPS signal asynchronously with a drive timing of the imaging device 10.

When the vertical synchronization signal VD becomes a high level at the time t2 and then becomes a low level, a vertical scan period of one frame starts in the imaging device 10. The vertical synchronization signal VD is a signal that is asynchronous with the PPS signal.

When the horizontal synchronization signal HD becomes a high level at the time t3 and then becomes a low level, a first horizontal scan period starts in the imaging device 10. Note that, in the following description, the time of a rising edge and the time of a falling edge of the horizontal synchronization signal HD may be collectively referred to as the start time of the horizontal scan period. In the imaging device 10, the row scanning circuit 120 selects the first to fourth pixel rows, and the column readout circuits 130A and 130B read out pixel signals from four rows. The AFE 12 converts a pixel signal into digital image data, and the DSP 13 outputs the image data resulted after signal processing to the image memory 14 and the information addition unit 18. The time information generation unit 17 outputs the counter value at the time t3 to the information addition unit 18 as time information. The information addition unit 18 adds time information, location information, and the like to the image data on the first to fourth pixel rows. Thereby, the start time t3 of the first horizontal scan period can be recorded in a time resolution of $10^{-7}$ seconds.

When the horizontal synchronization signal HD becomes a high level at the time t3-2 and then becomes a low level, the second horizontal scan period starts. The information addition unit 18 adds the counter value at the time t3-2 to the fifth to eighth pixel rows as time information. Similarly, at the time t3-3, . . . , t3-300 when the horizontal synchronization signal HD becomes a high level, the time information at the start time t3-3, . . . , t3-300 of each horizontal scan period is added to the image data. In the present embodiment, since four pixel rows are simultaneously read out within one horizontal scan period, accurate time information can be added on a four-pixel-row basis. In such a way, by adding the start time of the horizontal scan period to a part of the rows of image data, the row of image data and time information can be recorded in association with each other.

Thereby, time information with a high time-resolution can be known for all the rows of saved image data. In particular, when cut out of a Region of Interest (ROI) is performed from image data or when reduced drive of the imaging device 10 or the like is performed, the acquisition time of each row can be accurately known. In such a case, the advantage of the present embodiment becomes more significant.

Figures 6A, 6B:
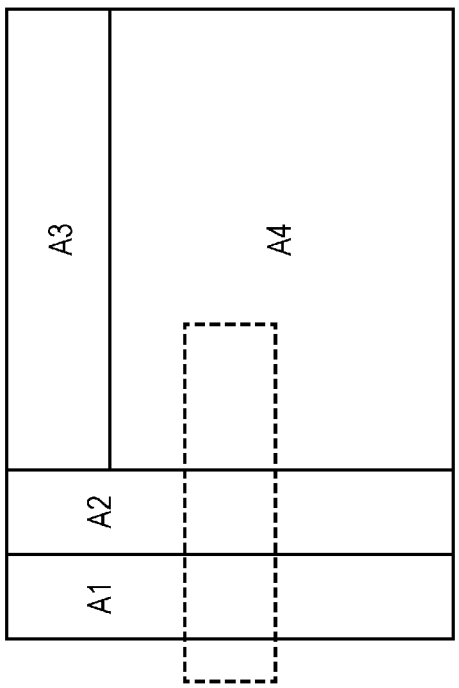
FIG. 6A and FIG. 6B are diagrams illustrating an adding method of time information to image data in the first embodiment.

FIG. 6A and FIG. 6B are diagrams illustrating a method of adding time information to image data in the present embodiment and illustrate image data output from the information addition unit 18. FIG. 6A illustrates image data of one frame. Image data of one frame includes a data section A1 in which time information, location information, or the like is recorded, a data section A2 for horizontal OB pixels, a data section A3 for vertical OB pixels, and a data section A4 for effective pixels. FIG. 6B illustrates a data area surrounded with a dashed line of FIG. 6A, in which one-pixel data is illustrated by one block. When one-pixel data is illustrated by 16-bit data, that is, by two bytes, information of ASCII code, two-byte character, or the like can be written in one pixel.

The data section A1 for the time information or the like may be added to the left side of the horizontal OB data (that is, the preceding time) or may be added to the right side of the effective pixel data (that is, the subsequent time), for example. Furthermore, the data section A2 for the horizontal OB may be replaced with the data section A1 for time information or the like. In the present embodiment, the timing of determining time information is the time of starting outputting the horizontal synchronization signal HD, that is, image data of a scan row. Thus, data of the leading part of the horizontal OB closest to the horizontal synchronization signal HD is replaced with the data part A1 of time information.

The imaging device 10 of the present embodiment can simultaneously output pixel signals of 16 channels of four rows by four columns by using progressive scan. For example, when the number of scan rows (the number of times of scan) in one frame is 300, the total number of pixel rows will be 1200 pixel rows=4 pixel rows×300. When the number of times of column scan per horizontal scan is 540, the total number of pixel columns will be 2160 pixel columns=4 pixel columns×540. Further, the imaging device 10 can perform a rolling shutter operation, and image data converted into a digital form is output in 16 bits. Note that the number of pixels and the number of bits of image data are not limited to the above-described example.

Time information or the like is stored in the leading four pixel columns of the four pixel rows associated with one scan row of the horizontal OB data, that is, 16 pixels in a form of binary data. Here, the leading 16 pixels of the OB data are denoted as px00, px01, px02, px03, px10, px11, px12, px13, px20, px21, px22, px23, px30, px31, px32, and px33, respectively. In such a way, 16 pixels of four by four can be handled as a data unit A11. Each of the pixels px00 to px33 has 16 bits (b0 to b15), and time information or the like is allocated to each bit of the pixels px00 to px33 as indicated below. In the present embodiment, location information and capturing information in addition to time information are recorded as described below.

Location information includes longitude information and latitude information. Data indicating whether the location information is enabled or disabled is stored in the bit b15 of the pixel px11. That is, the bit b15 is "0" when acquisition of location information is enabled and "1" when acquisition of location information is disabled. The longitude information is denoted by coordinates of a direction (south (S) or north (N)), degrees (dd), and minutes (mm. mmmm). The information of direction is stored in the bit b15 of the pixel px13, where the data bit is "0" when the direction is S, and the data bit is "1" when the direction is N. The degree (dd) ranges from 0 to 90 and is stored in the bits b8 to b14 of the pixel px11 as 7-bit data. The minute (mm. mmmm) ranges from 0 to 59.9999, and the integer part thereof is stored in the bits b0 to b5 of the pixel px11 as 6-bit data. The fraction part is stored in the bits b0 to b13 of the pixel px13 as 14-bit data. The latitude information is denoted by coordinates of a direction (east (E) or west (W)), degrees (ddd), and minutes (mm. mmmm). The information of direction is stored in the bit b15 of the pixel px33, where the data bit is "0" when the direction is E, and the data bit is "1" when the direction is W. The degree (ddd) ranges from 0 to 180 and is stored in the bits b8 to b15 of the pixel px31 as 8-bit data. The minute (mm. mmmm) ranges from 0 to 59.9999, the two-digit integer part thereof is stored in the bits b0 to b5 of the pixel px31 as 6-bit data, and the four-digit fraction part is stored in the bits b0 to b13 of the pixel px33 as 14-bit data.

The GPS time information includes the leap-second information, the GPS week information, and the GPS second information as described above. The data indicating whether the GPS leap-second information is enabled or disabled is stored in the bit b15 of the pixel px01. The data bit is when acquisition of the leap-second information is enabled, and the data bit is "1" when acquisition of the leap-second information is disabled. The leap-second information is denoted in a numerical value of −128 to 127 and stored in the bit b0 to b7 of the pixel px01 as 8-bit data.

The information indicating whether the GPS week information is enabled or disabled is stored in the bit b15 of the pixel px10. The data bit is "0" when acquisition of the GPS week information is enabled, and the data bit is "1" when acquisition of the GPS week information is disabled. As described above, the week information obtained from the GPS is a week number starting from Jan. 6, 1980 and circulating from 0 to 1023, and the current GPS week information is denoted by (1024+week number). When recorded from Mar. 27, 2016 to Nov. 11, 2035, the GPS week information is 12-bit data from 1890 to 2914. The GPS week information converted in such a way is stored in the bits b0 to b11 of the pixels px10.

The data indicating whether the GPS second information is enabled or disabled is stored in the bit b15 of the pixel px12. The data bit is "0" when acquisition of the GPS second information is enabled, and the data bit is "1" when acquisition of the GPS second information is disabled. As described above, the GPS second information is progress information within the GPS week and may take a value within 604800 seconds=7 days×24 hours×60 minutes×60 seconds. The GPS second information is stored in the bits b0 to b15 of the pixels px03 and bits b0 to b3 of the pixels px12 as 20-bit data from 0 to 604799.

The data indicating whether or not the PPS signal is received is stored in the bit b15 of the pixel px30. The data bit is "0" when the PPS signal is received, and the data bit is when no PPS signal is received. Further, the data indicating whether or not the counter is reset is stored in the bit b15 of the pixel px20. After the imaging system is started up, the data bit is "0" when the counter has been reset by the PPS signal at least once, and the data bit is "1" when the counter has not been reset. The time information in a unit of $10^{-7}$ seconds reset by the PPS signal is 20-bit data from 0 to 999999 and stored in the bits b0 to b15 of the pixels px21 and bits b0 to b3 of the pixels px30.

Further, in the present embodiment, in order to supplement time information and location information, capturing information indicating capturing conditions such as exposure time, a frame number, a scan row number, or the like may be added to the image data. The exposure time is set in the imaging device 10 and represented by 30-bit data of 0 to 600000000μ seconds. The data of the exposure time is stored in the bits b0 to b15 of the pixel px23 and the bits b0 to b13 of the pixel px32. The frame numbers are continuous values counted up on a frame basis and are stored in the bits b0 to b15 of the pixel px00 as 16-bit data from 0 to 0xFFFF. By confirming the frame number after capturing, missing of the continuously captured frames can be easily known. The scan row number is represented by 9-bit data from 0 to 299 and stored in the bits b0 to b8 of the pixel px20. The scan row number is added for the purpose of easier confirmation of the association of the time information and the location information with the captured row. In such a way, together with accurate time information at the starting time of the horizontal scan period, the location information and the capturing information are added to the OB data section on each scan row.

Figure 7A:
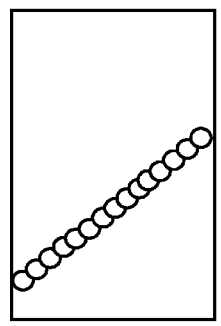
FIG. 7A and FIG. 7B are diagrams illustrating a capturing object and time information in the first embodiment.
Figure 7B:
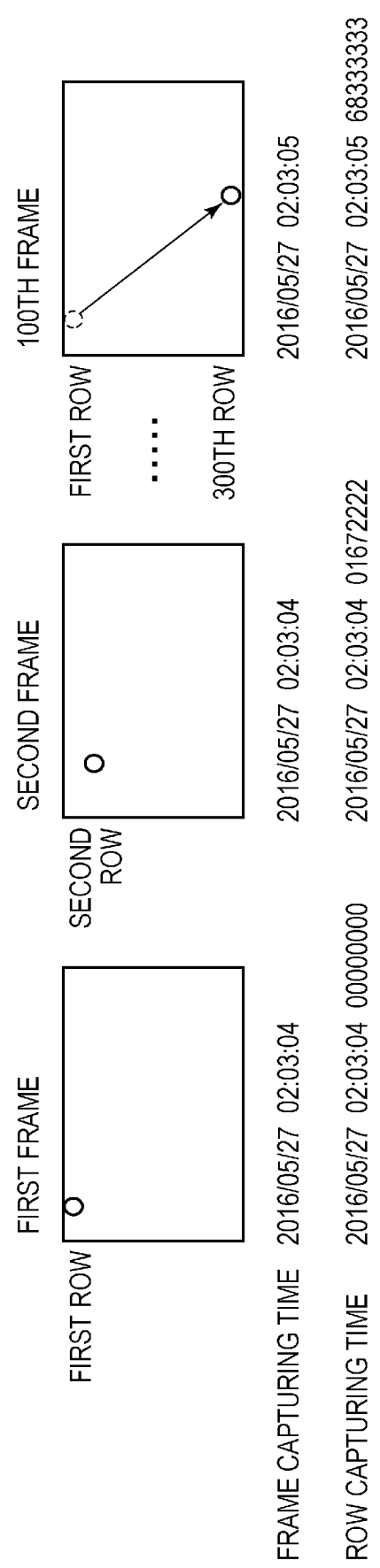

FIG. 7A and FIG. 7B are diagrams illustrating a capturing object and time information in the present embodiment. FIG. 7A illustrates motion of a subject within a capturing area, and FIG. 7B illustrates capturing images of respective frames. It is here assumed that the number of frames per second is 60 fps (16.7 msec/frame) and the number of scan rows by simultaneous readout of four pixel rows is 300 (1200 pixel rows). In the first frame, a subject is captured in the first scan row (the first to fourth pixel rows). The time information of year, month, day, hour, minute, and second "2016/5/27 02:03:04" and time information in a unit of $10^{-7}$ seconds "000000000" are recorded in the leading part of the OB data section of the first scan row. In the second frame, the subject is located on the second scan row (the fifth to eighth pixel rows), and the time information in a unit of $10^{-7}$ seconds is "01672222". The subject further moves and is captured on the 300th acquisition row of the 100th frame. At this time, the time information of year, month, day, hour, minute, and second "2016/5/27 02:03:05" and time information in a unit of $10^{-7}$ seconds "68333333" are recorded in the OB data section of the scan row.

As discussed above, according to the present embodiment, when a subject moves within a capturing area, a capturing position within a frame where the subject is captured and absolute time information at capturing can be recorded in accurate association with each other. In the conventional imaging system, only the start time or the end time of capturing or the save time is added on a frame basis. Further, the time information to be added is information in a unit of one second that depends on the GPS time information, and thus the capturing position of a subject within a frame and the absolute time information cannot be accurately associated with each other. The imaging system of the present embodiment generates first time information corresponding to a process timing of a pixel signal of one of the plurality of rows and second time information that is time information corresponding to a pixel signal of another row of the plurality of rows and has a value different from the first time information. That is, time information having a higher resolution than one frame period is generated, and thereby information of capturing position of a subject within a frame (scan row number) and time information are recorded in association with each other. Thereby, the capturing time of the subject, that is, the moment when the subject is present at a certain point can be recorded as more accurate absolute time information.

In an astronomical observation, when capturing a motion image of a moving object such as a meteor, space debris, or the like, the location information of the moving object and the accurate absolute time information thereof will be important in order to calculate the accurate orbit of the moving object. Here, the absolute time refers to the International Atomic Time defined by the universal time coordinated (UTC) or the like, for example. Further, in the field of so-called remote sensing for observing a far object, capturing of a moving object or capturing from a moving object such as an airplane, an artificial satellite, or the like is performed. Also in this case, with the location of an object with respect to the earth and accurate time information, it is possible to obtain more pieces of information on the object. According to the present embodiment, when capturing a motion image of a moving object such as a meteor, space debris, or the like in an astronomical observation, for example, the position of the moving object within a frame and the accurate absolute time information can be recorded in association with each other.

Although time information (the time t1 of FIG. 5) that is the reference of a counter in a unit of $10^{-7}$ seconds is defined by the PPS signal obtained from the GPS satellite in the present embodiment, the present invention is not limited thereto. For example, the standard radio wave may be received, or information of a time server may be acquired from a network. Further, although the synchronization signals VD and HD are generated by the pulse generation unit 15, a synchronization signal generated by the imaging device 10 may be detected to acquire the acquisition time of the counter (the time t3 of FIG. 5). Furthermore, although the counter operates at 10 MHz, that is, a cycle of $10^{-7}$ seconds, the counter is not limited to the above example as long as it has a higher time-resolution than the PPS signal or the frame period that is used as the reference of the counter. Further, although the time information generation unit 17 is provided outside the imaging device 10 in the present embodiment, the imaging device 10 may have the time information generation unit 17.

Further, although the acquisition timing of time information is at the rising time of the horizontal synchronization signal HD (the time t3 of FIG. 5) in the present embodiment, various time may be the reference as long as it is associated with a scan row of the imaging device 10. For example, as described later, any time associated with the processing timing of a pixel signal can be used, such as the falling time of the horizontal synchronization signal HD, the start time or the end time of exposure of each acquisition row, the start time or the end time of readout of the column readout circuits 130A and 130B, the end time of charge transfer from the photoelectric conversion unit to the floating diffusion part, or the like.

Although the information addition unit 18 stores time information for all the scan rows (1 to 300) of one frame, the present invention is not limited thereto. For example, the row for storing time information may be one of two rows such as even rows or odd rows, may be one of any multiple rows, or may be a row selected at random. Furthermore, time information may be stored only on the row on which a subject is recognized. Further, the storage location of time information is not limited to the above-described examples and may be output separately from image data as long as the association between the time information and the captured row is clear. In such a way, the row for storing time information may be properly changed in accordance with a condition such as an output format of image data, a memory capacity, a drive specification of the imaging device, acquired information, or the like.

Second Embodiment

FIG. 8 is a timing chart of an imaging system of the present embodiment. In the present embodiment, the time information generation unit 17 outputs a counter value as time information at the falling time of the horizontal synchronization signal HD. Since other configurations and the control method are similar to those of the first embodiment, features different from the first embodiment will be mainly described.

At the time t1, in response to detecting a rising edge of the PPS signal, the time information generation unit 17 resets a counter and counts up the counter every $10^{-7}$ seconds. The vertical synchronization signal VD becomes a high level at the time t2 and then becomes a low level, a vertical scan period of one frame starts in the imaging device 10. The horizontal synchronization signal HD becomes a high level and then becomes a low level at the time t4, and thereby a horizontal scan period starts in the imaging device 10. At the same time, the time information generation unit 17 can record the start time t4 of the horizontal scan period at a high time-resolution by recording the counter value in the OB data section. In a similar manner, at the time t4-2, t4-3, . . . , t4-300 when the horizontal synchronization signal HD becomes a low level, the time information generation unit 17 records the counter value and the scan row in association with each other. Also in the present embodiment, accurate time information can be recorded in a similar manner to the first embodiment.

Third Embodiment

FIG. 9 is a timing chart of an imaging system of the present embodiment. In the present embodiment, the time information generation unit 17 outputs the counter value as time information at the time t5 when the column readout circuits 130A and 130B end readout of pixel signals. In the following description, the time when the column readout circuits 130A and 130B end readout may be called an end time of a horizontal scan period. Since other configurations and the control method are similar to those of the first embodiment, features different from those of the first embodiment will be mainly described.

At the time t1, in response to detecting a rising edge of the PPS signal, the time information generation unit 17 resets a counter and counts up the counter. The vertical synchronization signal VD becomes a high level at the time t2 and then becomes a low level, a vertical scan period of one frame starts in the imaging device 10. The horizontal synchronization signal HD becomes a high level and then becomes a low level, and thereby a horizontal scan period starts in the imaging device 10. The column readout circuits 130A and 130B read out image signals of one scan row (four pixel rows), and the column scan circuits 150A and 150B scan the column readout circuits 130A and 130B. Thereby, pixel signals are sequentially output from the imaging device 10 on a four-pixel-column basis (on a 16-pixel basis). For one scan row, 540 times of output of the pixel signal is performed, and upon the completion of the last 540th output, the timing generator 160 generates a pulse signal HSR_END indicating the end of the output of the pixel signal. At the time t5, at the same time when the pulse signal HSR_END becomes a high level, the time information generation unit 17 records the counter value as time information. Thereby, the end time t5 of the horizontal scan can be recorded with a high time-resolution. In a similar manner, once the pulse signal HSR_END of the end of the horizontal scan becomes a high level, the counter values at the time t5-2, t5-3, . . . , t5-300 are added to a part of the scan row. This allows all the scan rows of image data and the absolute time information to be associated with each other with a high time-resolution.

Note that, in the present embodiment, the counter value may be recorded as time information at the time of the column readout circuits 130A and 130B starting readout of pixel signals. That is, the time when the pixel signal is output from the imaging device 10 may be recorded as time information on each scan row.

Fourth Embodiment

FIG. 10 is a timing chart of an imaging system of the present embodiment. In the present embodiment, at the time when the transfer transistor M1 is transitioned from an on-state to an off-state and charge transfer from the photoelectric conversion unit PD ends, the counter value is recorded as time information. The control signal TX becomes a high level and thereby the transfer transistor M1 is turned on, and charges generated at the photoelectric conversion unit PD are transferred to the floating diffusion part FD. When the pixel 110 performs a rolling shutter operation, the control signal TX determines the end time of charge accumulation at the photoelectric conversion unit PD. The imaging system of the present embodiment will be described below mainly for the features different from those of the first embodiment.

Once the horizontal synchronization signal HD becomes a high level and then becomes a low level at the time t4, the pixels 110 on the first scan row (the first to fourth pixel rows) are selected by the row scanning circuit 120, and pixel signals are read out by the column readout circuits 130A and 130B. That is, as illustrated in FIG. 4, after the photoelectric conversion unit PD is reset, the control signal TX becomes a high level, and the transfer transistor M1 is turned on. This causes charges to be transferred from the photoelectric conversion units PD to the floating diffusion parts FD, and voltages in accordance with charges are read out by the column readout circuits 130A and 130B from the amplification transistors M3 via the column signal lines L.

At the time t6, the control signal TX becomes a low level, and the transfer transistor M1 is turned off. Thereby, accumulation and readout of charges of the photoelectric conversion unit PD end. At the same time, the time information generation unit 17 outputs the counter value at the time t6 as time information.

The time t6 when the control signal TX becomes a low level matches the end time of charge accumulation in the pixel 110. Therefore, the counter value at the time t6 represents the capturing time of the imaging device 10 in a more accurate manner.

In a column scan period, the column readout circuits 130A and 130B are scanned by the column scanning circuits 150A and 150B, and pixel signals are sequentially output from the imaging device 10. The information addition unit 18 adds the time information at the time t6 to the scan row associated with image data. Similarly, at the time t6-2, t6-3, . . . , t6-300, the counter value is added as accurate time information.

By adding the end time of charge transfer as time information to the scan row as described above, a scan row and capturing time can be recorded in association with each other with a high time-resolution. Further, since the counter is synchronized with the absolute time obtained from a GPS satellite, the end time of charge accumulation can be recorded as the significantly accurate absolute time.

Fifth Embodiment

While the imaging device 10 can perform a normal capturing operation or a rolling shutter operation in the first to fifth embodiments, the imaging device 10 can perform a global electronic shutter operation in the present embodiment. In the global electronic shutter, exposure operations of all the pixels are performed at the same time. In the present embodiment, time information is determined with respect to the reference of the end time of exposure operations for all the pixels.

Figure 11:
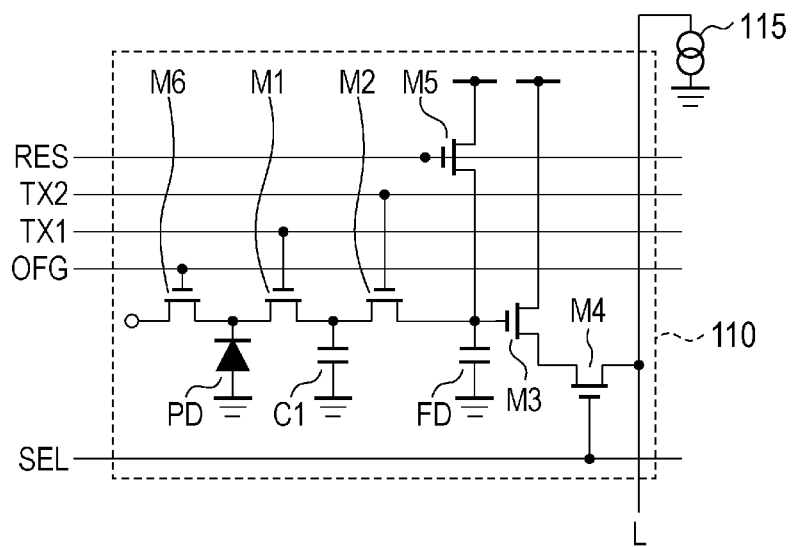
FIG. 11 is an equivalent circuit diagram of a pixel of a fifth embodiment.

FIG. 11 illustrates an equivalent circuit of the pixel 110 according to the present embodiment. The pixel 110 includes a photoelectric conversion unit PD, a holding unit C1, a floating diffusion part FD, a first transfer transistor M1, a second transfer transistor M2, an amplification transistor M3, a selection transistor M4, a reset transistor M5, and an overflow transistor M6. When turned on, the first transfer transistor M1 transfers charges of the photoelectric conversion unit PD to the holding unit C1, and the holding unit C1 holds the charges transferred from the photoelectric conversion unit PD. In all the pixels 110, the first transfer transistors M1 are simultaneously driven, and thereby the timings of the end of exposure of the photoelectric conversion units PD can be controlled all at once. That is, by controlling the control signals TX1 on respective rows to be simultaneously turned on or off, it is possible to simultaneously control exposure timings in all the pixels 110. When turned on, the overflow transistor M6 can drain charges of the photoelectric conversion unit PD to the overflow drain such as a power source node. According to the present embodiment, while the holding unit C1 holds charges, the photoelectric conversion unit PD can accumulate newly generated charges, which can realize the global electronic shutter function that causes the timings of photoelectric conversion in all the pixels 110 to be matched each other.

FIG. 12 is a timing chart of the imaging system of the present embodiment. First, the control signals OFG are set to a high level and thereby the overflow transistors M6 are turned on in all the pixels 110, and charges of the photoelectric conversion units PD are drained. Once the overflow transistors M6 are turned off, an exposure period in the photoelectric conversion units PD starts in all the pixels 110. Then, in all the pixels 110, the control signals TX1 become a high level, and the first transfer transistors M1 are turned on. This causes charges of the photoelectric conversion units PD to be transferred to the holding units C1.

At the time t7, the control signals TX1 become a low level in all the pixels 110, and the exposure period ends. At the same time, the time information generation unit 17 outputs the counter value at the time t7 as time information. Then, pixel signals on respective rows are sequentially read out by the column readout circuits 130A and 130B and output from the imaging device 10. The information addition unit 18 adds the same counter value to respective scan rows sequentially output from the imaging device 10. Thereby, the time t7 of the end of exposure of all the pixels 110 can be recorded with a high time-resolution.

Similarly, in each frame of a motion image, capturing operations having the matched exposure period are performed, and each end time of the exposure period is added to image data. That is, the time information generation unit 17 adds the counter values at the time t7-2, t7-3, . . . to image data of respective frames. Therefore, the capturing time of respective frames (the end time of exposure) can be associated with image data and recorded with a high time-resolution.

Figure 13A:
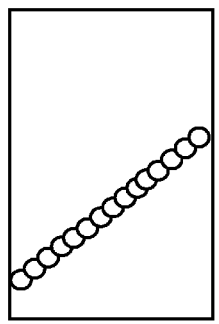
FIG. 13A and FIG. 13B are diagrams illustrating a capturing object and time information of the fifth embodiment.
Figure 13B:
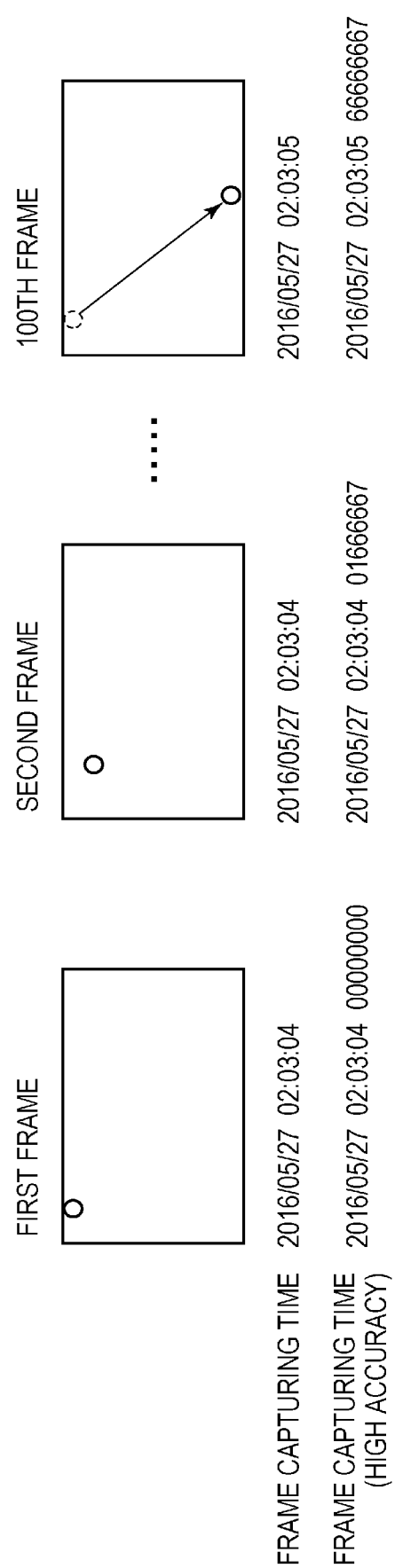

FIG. 13A and FIG. 13B are diagrams illustrating a capturing object and time information in the present embodiment. FIG. 13A illustrates the motion of a subject within the capturing area, and FIG. 13B illustrates capturing images of respective frames. In the conventional imaging system, the time resolution is in a unit of one second that depends on the GPS time information for one capturing frame. Thus, if capturing is performed with exposure time less than one second in one frame, the same time information (for example, 02:03:04) is undesirably recorded over a plurality of frames. On the other hand, according to the present embodiment, the end time of exposure of each frame can be recorded as time information with a high resolution. This allows for accurately recording the capturing time of each frame.

Sixth Embodiment

Figure 14:
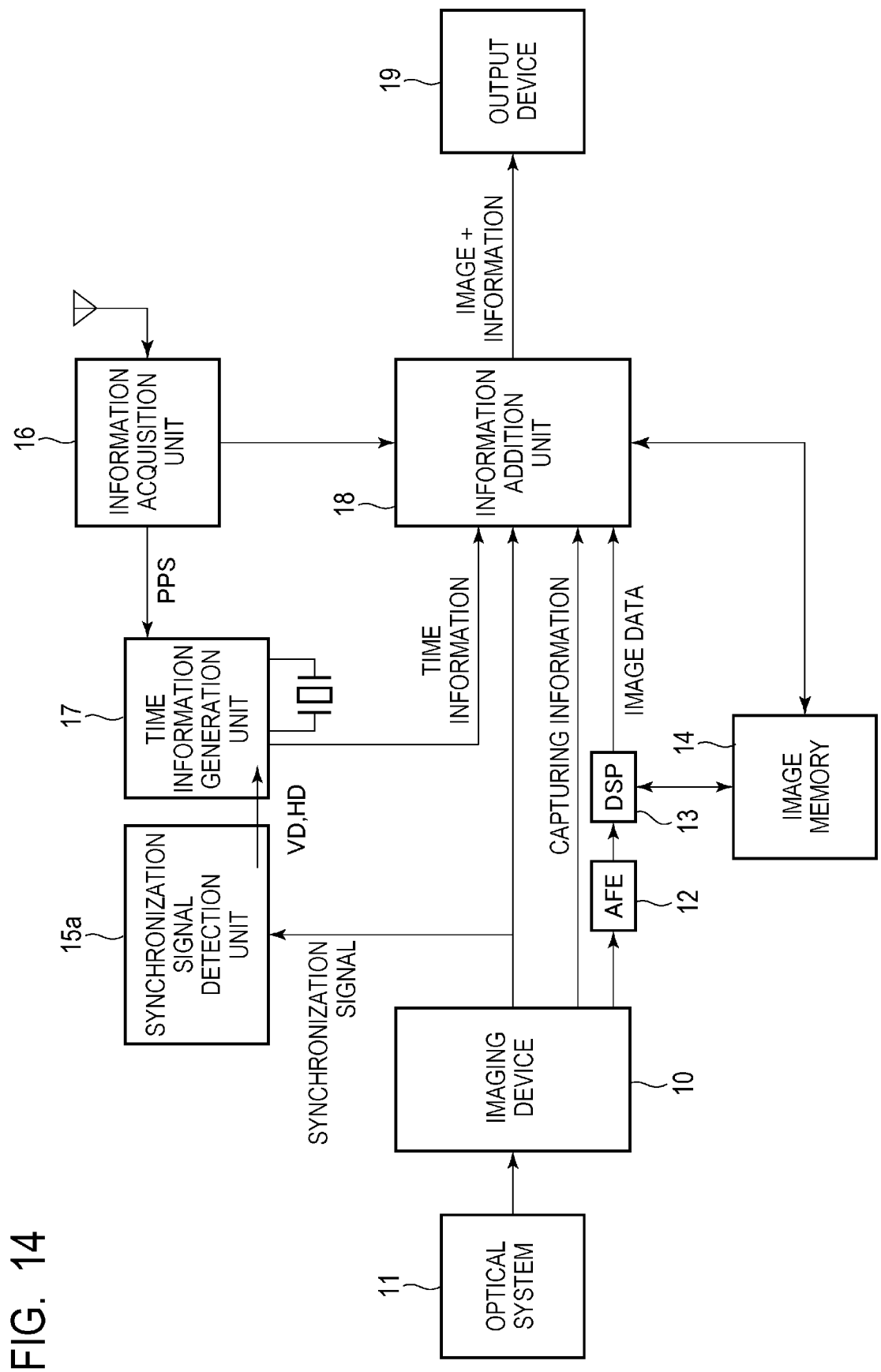
FIG. 14 is a block diagram of an imaging system of a sixth embodiment.

FIG. 14 is a block diagram of an imaging system of the present embodiment. In the first to fifth embodiments, the imaging device 10 is driven based on a synchronization signal generated by the pulse generation unit 15. In the present embodiment, instead of the pulse generation unit 15, a synchronization signal detection unit 15a is provided, which can detect the synchronization signal generated by the imaging device 10.

The imaging device 10 may take various configurations, and there is a configuration which generates the vertical synchronization signal VD and the horizontal synchronization signal HD inside the imaging device 10 or a configuration which generates the horizontal synchronization signal HD inside the imaging device 10 based on the vertical synchronization signal VD supplied from the outside. When such the imaging device 10 is used, it is preferable to detect a synchronization signal of the imaging device 10.

According to the present embodiment, the synchronization signal detection unit 15a can detect the vertical synchronization signal VD and the horizontal synchronization signal HD in the imaging device 10 and output the detected signals to the time information generation unit 17. Since other configurations are similar to those of the first to fifth embodiments, the description thereof will be omitted. Also in the present embodiment, addition of time information to the row of image data allows for accurately identifying the acquisition time of each row.

Other Embodiments

The embodiments described above are mere examples of the present invention, and modified implementations are possible within the scope not departing from the spirit of the present invention. For example, the imaging device is not limited to a CMOS image sensor and may be a CCD image sensor. Further, an internal clock which is periodically calibrated by a radio wave from the GPS satellite may be provided in the imaging system, and the absolute time information may be generated based on the internal clock when it is difficult to receive the radio wave from the GPS satellite.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-198662, filed Oct. 7, 2016, which is hereby incorporated by reference herein in its entirety.

What is claimed is:

1. An imaging device comprising:
a plurality of pixels arranged in a plurality of rows, each of the plurality of pixels outputting a pixel signal by a photoelectric conversion; and
a time information generation unit configured to be supplied with a reference time from an outside of the imaging device, and configured to generate time information by using the reference time, the time information being information having a higher time-resolution than the reference time.

2. The device according to claim 1, further comprising an output unit configured to output the pixel signal and the time information, to an outside of the imaging device.

3. The device according to claim 1, wherein the device is a CMOS image sensor.

4. The device according to claim 1, wherein the device is a CCD image sensor.

5. The device according to claim 1, wherein the reference time is information transferred by a standard radio wave.

6. The device according to claim 1, wherein the reference time is GPS time information.

7. The device according to claim 1, wherein the time information generation unit generates the time information using a PPS signal acquired from the reference time.

8. The device according to claim 1, wherein the reference time is supplied from a time server via a network.

9. The device according to claim 1, further comprising a row scan unit configured to perform a scan of the plurality of pixels on a row basis,
wherein the time information indicates a start time of the scan, or an end time of the scan.

10. The device according to claim 1, wherein the time information generation unit generates, as the time information, first time information corresponding to a processing timing of the pixel signal on one of the plurality of rows and second time information corresponding to the pixel signal on another of the plurality of rows and having a different value from the first time information.

11. The device according to claim 1, further comprising a readout unit that reads out pixel signals respectively from the plurality of pixels on a selected row,
wherein the time information indicates a time when the readout unit starts readout of the pixel signals.

12. The device according to claim 1, further comprising a readout unit that reads out pixel signals respectively from the plurality of pixels on a selected row,
wherein the time information indicates a time when the readout unit ends readout of the pixel signals.

13. An imaging system comprising an imaging device and an information generation unit that generates time information,
wherein the imaging device comprises:
a plurality of pixels arranged in a plurality of rows, each of the plurality of pixels outputting a pixel signal by a photoelectric conversion; and
an output unit that outputs a plurality of pixel signals,
wherein the time information generation unit is supplied with a reference time from outside of the imaging system, and generates the time information by using the reference time, the time information being information having a higher time-resolution than the reference time.

14. The system according to claim 13, wherein the imaging device is a CMOS image sensor.

15. The system according to claim 13, wherein the imaging device is a CCD image sensor.

16. The system according to claim 13, wherein the reference time is information transferred by a standard radio wave.

17. The system according to claim 13, wherein the reference time is GPS time information.

18. The system according to claim 13, wherein the time information generation unit generates the time information using a PPS signal acquired from the reference time.

19. The system according to claim 13, wherein the reference time is supplied from a time server via a network.

20. The system according to claim 13, wherein the imaging device further comprises a row scan unit configured to perform a scan the plurality of pixels on a row basis,
wherein the time information indicates a start time of the scan, or an end time of the scan.

21. The system according to claim 13, wherein the information generation unit generates, as the time information, first time information corresponding to a processing timing of the pixel signal on one of the plurality of rows and second time information corresponding to the pixel signal on another of the plurality of rows and having a different value from the first time information.

22. The system according to claim 13, the imaging device further comprises a readout unit that reads out pixel signals respectively from the plurality of pixels on a selected row,
wherein the time information indicates a time when the readout unit starts readout of the pixel signals.

23. The system according to claim 13, the imaging device further comprises a readout unit that reads out pixel signals respectively from the plurality of pixels on a selected row,
wherein the time information indicates a time when the readout unit ends readout of the pixel signals.

24. The system according to claim 13, wherein each of the pixels comprises a photoelectric conversion unit, a transfer transistor that transfers charges generated by the photoelectric conversion unit, and an amplification transistor that outputs each of the pixel signals based on charges transferred by the transfer transistor, and
wherein the time information indicates a time when the transfer transistor is transitioned from an on-state to an off-state.

25. The system according to claim 24, wherein the plurality of pixels can perform a rolling shutter operation in which an exposure timing in the photoelectric conversion unit is different from each row.

26. The system according to claim 13,
wherein each of the pixels comprises a photoelectric conversion unit, a holding unit, a first transfer transistor that transfers charges generated by the photoelectric conversion unit to the holding unit, a second transfer transistor that transfers charges in the holding unit, and an amplification transistor that outputs each of the pixel signals based on charges transferred by the second transfer transistor, and wherein the time information indicates a time when the first transfer transistor is transitioned from an on-state to an off-state simultaneously in the plurality of pixels.

27. The system according to claim 24, wherein the plurality of pixels can perform a global electronic shutter operation in which an exposure timing in the photoelectric conversion unit is the same in a frame.

28. The system according to claim 13, wherein the information generation unit further outputs at least one of location information and capturing information indicating a capturing condition.

29. The system according to claim 28, wherein the capturing information includes information of an exposure time in the plurality of pixels.

30. The system according to claim 28, wherein the capturing information includes a frame number.

31. The system according to claim 28, wherein the capturing information includes a scan row number associated with the time information.

32. The system according to claim 13, further comprising:
an data output unit outputs an image data on a frame basis; and
an information addition unit that adds the time information to the image data on a row or multiple rows basis simultaneously selected.

33. The system according to claim 13, further comprising an data output unit outputs an image data on a frame basis,
wherein the information addition unit adds the time information represented by binary data to the image data.

34. The system according to claim 13, further comprising a data output unit outputs an image data on a frame basis,
wherein the information addition unit adds the time information to a portion of the image data, and the portion corresponds to a light-shielded optical black pixel.

35. The system according to claim 13, wherein the time information indicates a start time of a horizontal scan period.

36. An imaging device comprising:
a plurality of pixels arranged in a plurality of rows, each of the plurality of pixels outputting a pixel signal by a photoelectric conversion;
an information generation unit configured to be supplied with a first information from an outside of the imaging device, and configured to generate a second information by using the first information, the second information being information having a higher resolution than the first information; and
an output unit configured to output, to an outside of the imaging device, a plurality of pixel signals and the second information,
wherein the first information indicates an operating situation of the imaging device.

37. An imaging system comprising an imaging device and an information generation unit,
wherein the imaging device comprises:
a plurality of pixels arranged in a plurality of rows, each of the plurality of pixels outputting a pixel signal by a photoelectric conversion; and
an output unit that outputs a plurality of pixel signals,
wherein the information generation unit is supplied with a first information from outside of the imaging system, and generates a second information by using the first information, the second information being information having a higher resolution than the first information, and
wherein the first information indicates an operating situation of the imaging device.

38. The device according to claim 36, wherein the device is a CMOS image sensor.

39. The device according to claim 36, wherein the device is a CCD image sensor.

40. The system according to claim 37, wherein the imaging device is a CMOS image sensor.

41. The system according to claim 37, wherein the imaging device is a CCD image sensor.

* * * * *